(No Model.) 2 Sheets—Sheet 1.
E. PECKHAM.
CAR BRAKE.
No. 555,527. Patented Mar. 3, 1896.
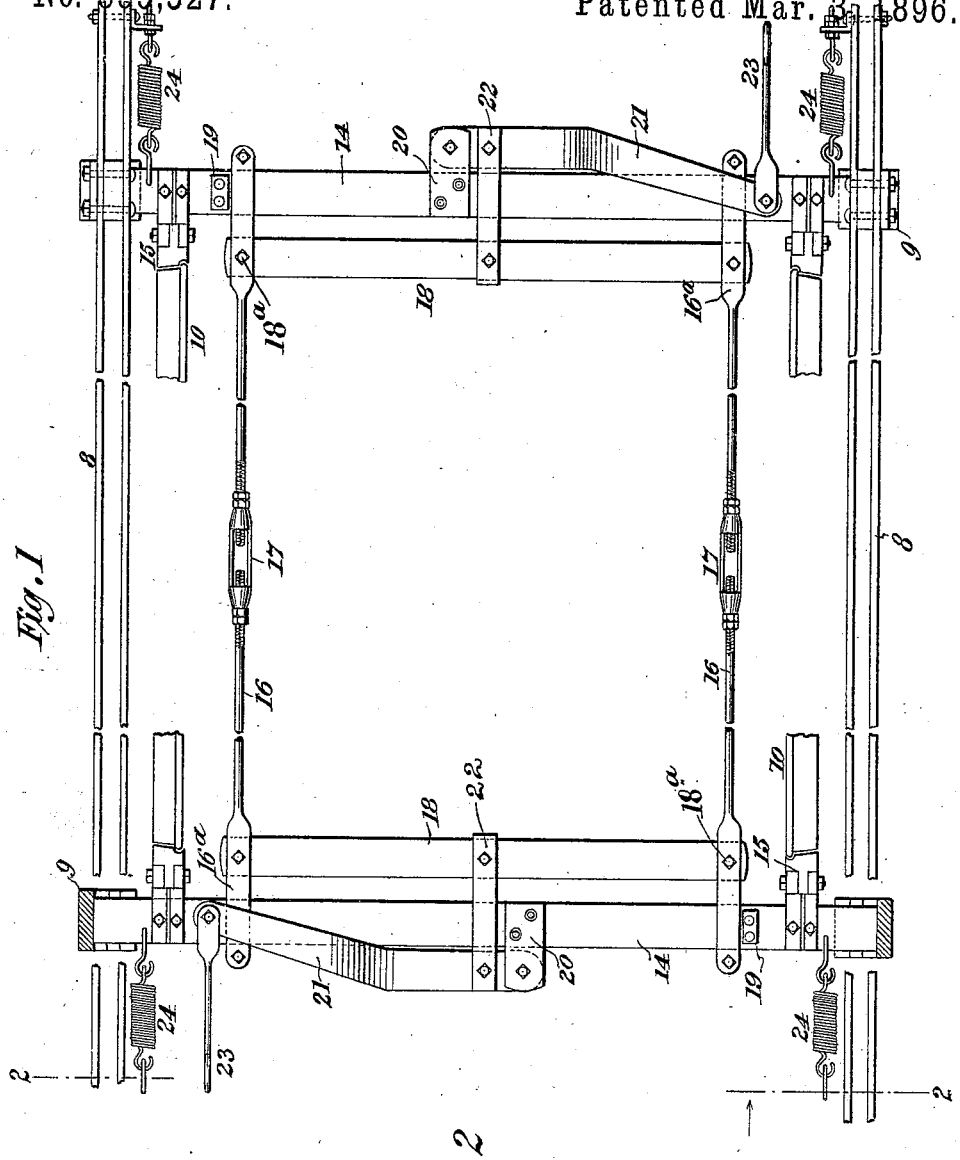
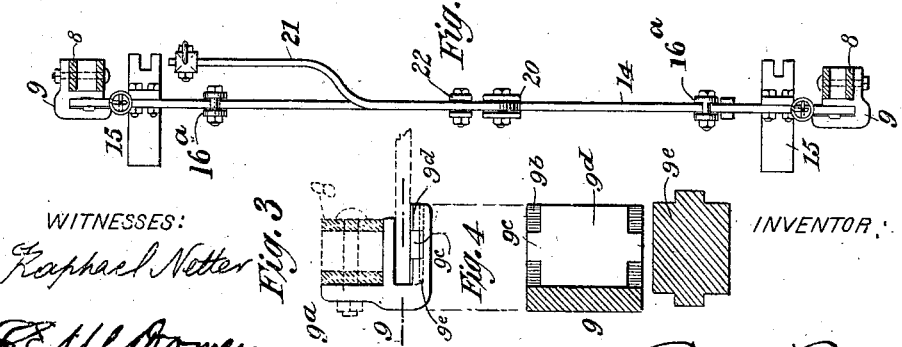
WITNESSES:
Raphael Netter
J. M. Bowen
INVENTOR:
Edgar Peckham

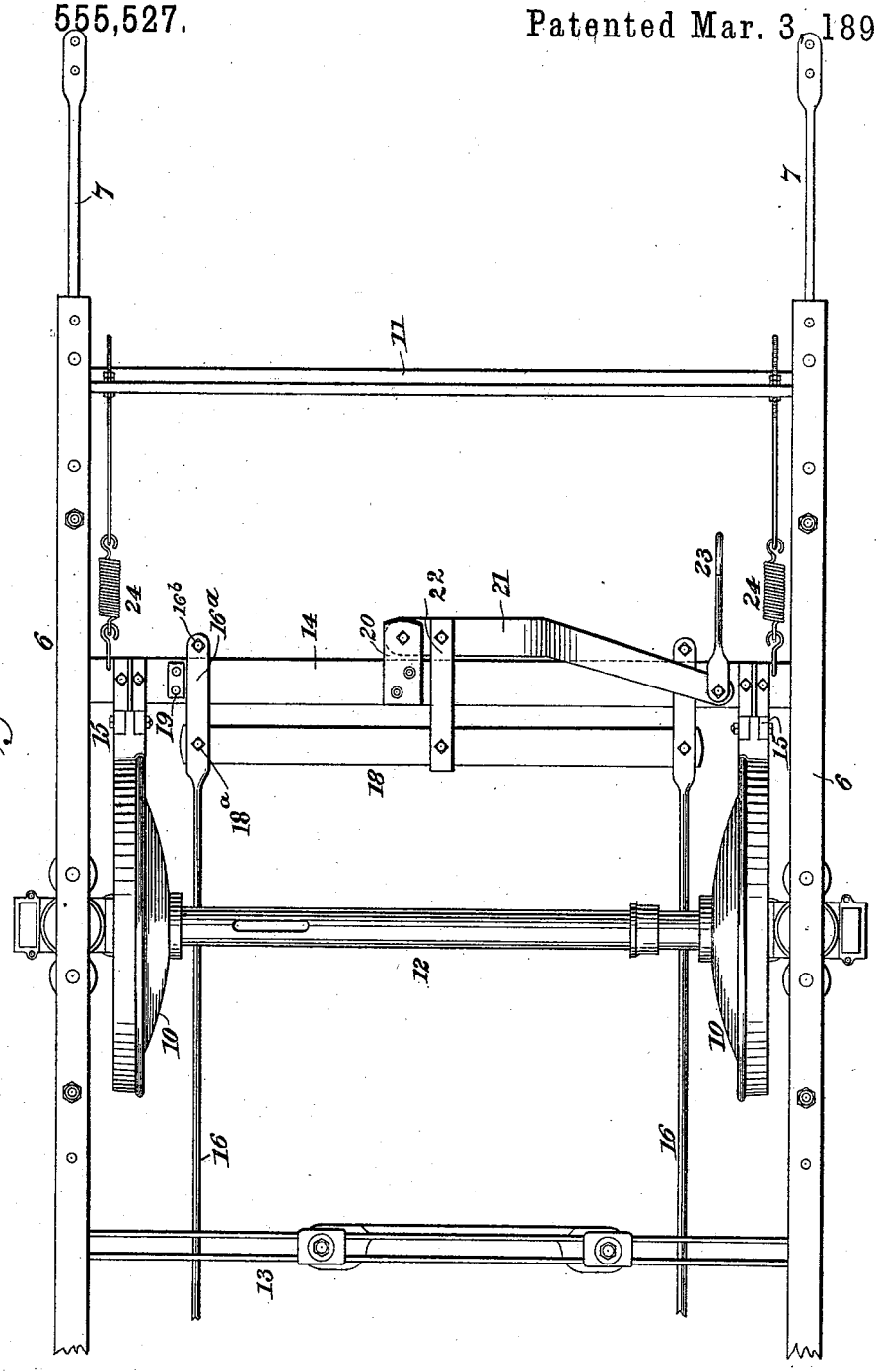

UNITED STATES PATENT OFFICE.

EDGAR PECKHAM, OF KINGSTON, NEW YORK.

CAR-BRAKE.

SPECIFICATION forming part of Letters Patent No. 555,527, dated March 3, 1896.

Application filed March 12, 1894. Serial No. 503,354. (No model.)

*To all whom it may concern:*

Be it known that I, EDGAR PECKHAM, a citizen of the United States, and a resident of Kingston, in the county of Ulster and State of New York, have invented certain new and useful Improvements in Car-Brakes, of which the following is a specification.

This invention has reference to brake mechanism adapted for use on four-wheeled trucks, and its construction is such that when operated the brake-shoes at both ends of the truck are applied at the same time.

The object of the invention is to devise a brake mechanism that shall be free from complications and positive and effective in its operation.

My brake mechanism is adapted to be applied to any four-wheeled truck, though intended more especially for application to trucks of electric and cable cars.

In the accompanying drawings, which form part of this specification, and wherein like features are indicated by like numerals of reference in the several views, Figure 1 is a plan view of portions of a truck having my brake mechanism applied thereto and showing the brake-bar supports at one end of the truck-frame in section. Fig. 2 is a sectional elevation on the line 2 2 of Fig. 1, looking in the direction of the arrow. Figs. 3 and 4 are detail views of the brake-bar support, and Fig. 5 is an enlarged plan view of one end of the truck with the brake mechanism applied.

Referring to the drawings, 6 indicates the sill or upper longitudinal chord of the truck-frame, and 7 end extension supports for the car-body. The side beams of the frame are preferably duplex, the lower beams 8 only being shown in the drawings in Figs. 1 and 2. The brake-bar supports or guides are indicated at 9 and are bolted in proper relation to the truck-wheels 10 to the lower longitudinal duplex beams 8, as seen in Figs. 1 and 2. Transverse bars, as 11, connect the sides of the truck-frame together, and inside the axles 12 there are arranged transverse connecting-bars 13 for motor-hanger supports.

The brake-bars are indicated at 14 and are located outside the axles transversely of the frame, their ends entering the supports or guides 9, within which said bars are adapted to slide longitudinally when the brake mechanism is operated.

The brake-shoes are indicated at 15 and they are bolted near the respective ends of the brake-bars 14, contiguous to the wheels 10, and are adapted to bind against the peripheries of the wheels when the brake-bars are forced inward.

The numeral 16 indicates connecting-rods arranged at each side of the truck-frame between the wheels 10 and which are made in two sections joined together by a turnbuckle arrangement 17, whereby the lengths of said rods may be adjusted. The respective ends of the rod 16 are bifurcated, as at 16$^a$, and embrace the brake-bars 14, and are bolted at 18$^a$ to the bars 18 at the respective ends of the truck, the said bars 18 being located inside the brake-bars 14 and arranged parallel thereto.

Secured to the top surface of the brake-bars 14, near the brake-shoes, are stops 19, which serve as guides for the bifurcated ends of the rod 16. There are but two of these stops shown, one on each bar at opposite ends. Bolted to the brake-bars 14 at their longitudinal centers are lugs 20, having ears between which there are pivoted the bent levers 21, the outer ends of which occupy a plane above the plane of the brake-bars 14, as best shown in Fig. 2. There are two of these levers 21, one at each end of the truck and oppositely placed. The levers 21 are bent both upward and sidewise toward the center of the truck, the upward inclination being to clear the flat ends of rods 16 and reduce the angle of the brake-chain connecting with the car-body. The bending of levers 21 toward the center of the truck is to increase the leverage and take up the slack of the brake-chains.

Bolted to the transversely-arranged bars 18 and central thereof are projecting pieces 22, arranged at right angles to the brake-bars 14 and said bars 18, the outer ends of said projecting pieces 22 being bifurcated and receiving the levers 21, to which they are pivotally connected. To the outer ends of levers 21 there is connected the chain or rod 23 extending to the brake-operating shaft, (not shown herein,) by which means the necessary strain can be put on the operating chain or rod to operate the brakes.

The brake-bar support or guide 9, which, as explained, is bolted to the lower longitudinal duplex beams 8 and is of the form shown in Figs. 2 and 3, has a vertical member $9^a$, which receives the bolts whereby the said support is secured to the beams 8, and a member $9^b$ at right angles to vertical member $9^a$ provided with a lateral opening through it to receive the end of the brake-bar 14, the width of said member $9^b$ being sufficient to retain the brake-bar when it is caused to move inward in the operation of the brake mechanism. The inner bottom surface of the member $9^b$ of the brake-bar support is of the form shown in Fig. 4—that is, with grooves or slots $9^c$ in two of its edges adapted to receive a bearing-plate $9^d$ of suitable material and upon which the ends of the brake-bars 14 slide in operation. As the bearing-plate $9^d$ is easily removed, it may be replaced by a new plate as often as may be necessary. By this means a uniformly-smooth movement of the brake-bars is secured and the necessity for frequent removal of the brake-bar supports for repairs is avoided. Underneath the bearing-plate $9^d$ I insert a fibrous bearing of indurated fiber or leather $9^e$ to prevent the rattling of the brake-beam and bearing-plate $9^d$ when going over crossings, and also to take up lost motion and make a closer fit.

The numeral 24 indicates the brake-releasing springs, which are of the spiral type. They are connected by any suitable means to the brake-beams 14, and also to the transverse connecting-bars 11, as shown in Fig. 5, or to separate castings bolted at any suitable point onto the main side bars 8 of the truck, as shown in Fig. 1. The bolts connecting the releasing-springs 24 with the transverse beam 11 or the side frame of the truck are provided with suitable threads and nuts, so that the springs can be properly adjusted, so as to keep the brake-shoes clear of the wheels when they are not in use, and thereby prevent unnecessary wear of shoes and noise. This is the object of the springs.

I have found in practice that to obtain uniform tension on both ends of the brake-beam, and to otherwise secure satisfactory results, it is essential to make the springs 24 of the spiral type. These springs I arrange in substantially the same plane as the brake-beam, and thus prevent all binding action between the ends of the brake-beam and the guides within which they are adjusted to operate, and the tension of said springs is readily adjusted by means of the screw-threaded bolts or rods connected to their outer ends and the nuts co-operating therewith.

It will be observed that I employ at each end of the truck but one operating-lever, which is so connected to the brake-bar and the supplemental transverse bar 18 as to cause the said bars at the end of the truck, where the brake-operating shaft is applied, to move toward each other. This causes the brake-bar at the opposite end of the truck to move toward the wheels and apply the brakes at the same time that the brakes are applied at that end of the truck where the brake-operating shaft is manipulated. In other words, it will be seen that if the brake chain or rod be tightened at either end of the car the lever 21 at the opposite end of the truck will remain in position against the beam 14, the flat ends of the connecting-rod 16 operating (by means of connecting-bolt $16^b$) against the brake-beam 14, forcing the brake-shoes against the wheels, while the operating-lever at the other end of the truck will force the corresponding brake-beam against the wheels at the same time, so that all four shoes come in contact with the wheels at the same time. The ends of the levers 21 are secured to the brake-beam 14 by means of lugs 20, and to the beam 18 by the projecting pieces or straps 22.

Having thus described my invention, what I claim as new, and desire to secure by Letters Patent, is—

1. In a brake mechanism for wheeled trucks, the combination with movable brake-bars and their operating devices, of brake-bar supports or guides having vertical members, whereby said supports or guides are secured to the truck-frame, and lateral members having horizontal slots or openings to receive the ends of the brake-bars, and removable bearing-plates placed loosely in the said supports or guides beneath the ends of the brake-bars received in said horizontal slots or openings.

2. In a brake mechanism for wheeled trucks, the combination with movable brake-bars and their operating devices, of brake-bar supports or guides having vertical members, whereby said supports or guides are secured to the truck-frame, and lateral members having horizontal slots or openings to receive the ends of the brake-bars, removable metallic bearing-plates in the said supports or guides beneath the ends of the brake-bars received in said horizontal slots or openings, and nonmetallic plates or cushions beneath said metallic bearing-plates, to prevent rattling of the latter.

3. In a brake mechanism for wheeled trucks, the combination with movable brake-bars and their operating devices, of the brake-bar supports or guides 9 having vertical members $9^a$ whereby said supports or guides are attached to the truck-frame, and horizontal members $9^b$ having slots or openings to receive the ends of the brake-bars, said members $9^b$ having, below said openings, grooves or slots $9^c$, and removable metallic bearing-plates $9^d$ in said supports below said openings, and having at their ends projections fitting in said grooves or slots $9^c$.

4. In a brake mechanism for wheeled trucks, the combination with movable brake-bars and their operating devices, of the brake-bar supports or guides 9 having vertical members $9^a$ whereby said supports or guides are attached to the truck-frame, and horizontal members $9^b$ having slots or openings to receive the ends of the brake-bars, said members $9^b$ having, below said openings, grooves or slots $9^c$; removable metallic bearing-plates $9^d$ in said supports below said openings and having at their ends projections fitting in said grooves or slots $9^c$, and non-metallic plates or cushions $9^e$ placed below said metallic bearing-plates and serving to prevent the latter from rattling.

Signed at New York, in the county of New York and State of New York, this 8th day of March, A. D. 1894.

EDGAR PECKHAM.

Witnesses:
 J. E. M. BOWEN,
 M. C. PINCKNEY.